(12) United States Patent
Ling (10) Patent No.: US 9,509,405 B2
(45) Date of Patent: Nov. 29, 2016

(54) MULTI-MODE FIBER NODE

(71) Applicant: MaxLinear, Inc., Carlsbad, CA (US)

(72) Inventor: Curtis Ling, Carlsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 92 days.

(21) Appl. No.: 14/157,105

(22) Filed: Jan. 16, 2014

(65) Prior Publication Data

US 2014/0199077 A1 Jul. 17, 2014

Related U.S. Application Data

(60) Provisional application No. 61/753,143, filed on Jan. 16, 2013.

(51) Int. Cl.
*H04B 10/2575* (2013.01)
*H04B 10/40* (2013.01)
*H04B 10/50* (2013.01)
*H04B 10/60* (2013.01)

(52) U.S. Cl.
CPC ......... *H04B 10/25751* (2013.01); *H04B 10/40* (2013.01); *H04B 10/50* (2013.01); *H04B 10/60* (2013.01)

(58) Field of Classification Search
None
See application file for complete search history.

(56) References Cited

U.S. PATENT DOCUMENTS

| 7,688,828 | B2 | 3/2010 | Chapman et al. | |
|---|---|---|---|---|
| 9,225,426 | B2 | 12/2015 | Ramesh et al. | |
| 2005/0262545 | A1* | 11/2005 | Masuda et al. | 725/129 |
| 2008/0002669 | A1 | 1/2008 | O'Brien et al. | |
| 2008/0175143 | A1 | 7/2008 | Ansley | |
| 2010/0135265 | A1 | 6/2010 | Asati et al. | |
| 2010/0142949 | A1 | 6/2010 | Mysore et al. | |
| 2012/0257103 | A1* | 10/2012 | Lavoie et al. | 348/441 |
| 2012/0257891 | A1 | 10/2012 | Boyd et al. | |
| 2012/0257893 | A1 | 10/2012 | Boyd et al. | |
| 2012/0291084 | A1 | 11/2012 | Rakib | |
| 2013/0195151 | A1* | 8/2013 | Miller et al. | 375/219 |
| 2013/0243439 | A1* | 9/2013 | Ito | 398/135 |

OTHER PUBLICATIONS

Int'l Search Report and Written Opinion for PCT/US2014/011483 dated May 9, 2014.

* cited by examiner

*Primary Examiner* — Darren E Wolf
(74) *Attorney, Agent, or Firm* — McAndrews Held & Malloy (57) ABSTRACT

In a first configuration, circuitry of a fiber node may be configured to modulate an optical carrier by an analog upstream electrical signal received via the electrical network. In a second configuration, the circuitry may be configured to digitize the analog upstream electrical signal to generate a digitized upstream signal, and modulate the optical carrier with the digitized upstream signal. An optical receiver of the fiber node may be configured to convert a downstream optical signal to a downstream electrical signal. In the first configuration, the downstream electrical signal may be a first analog signal and the circuitry may be configured to output the first analog signal into the electrical network. In a third configuration, the downstream electrical signal is a digitized waveform and the circuitry is configured to convert the digitized waveform to a second analog signal and output the second analog signal into the electrical network.

20 Claims, 10 Drawing Sheets

MULTI-MODE FIBER NODE

CLAIM OF PRIORITY

This patent application makes reference to. claim priority to and claims benefit from U.S. Provisional Patent Application No. 61/753,143, which was filed on Jan. 16, 2013.

The above identified application is hereby incorporated herein by reference in its entirety.

INCORPORATION BY REFERENCE

This patent application makes reference to U.S. patent application Ser. No. 14/147,628 titled "Advanced Fiber Node" filed on Jan. 6, 2014, which is hereby incorporated herein by reference in its entirety.

TECHNICAL FIELD

Aspects of the present application relate to communication networks. More specifically, aspects of the present application relate to a method and system for a multi-mode fiber node.

BACKGROUND OF THE INVENTION

Conventional systems and methods for communications can be overly power hungry, slow, expensive, and inflexible. Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and method for a multi-mode fiber node, substantially as shown in and/or described in connection with at least one of the figures, as set forth more completely in the claims.

Advantages, aspects and novel features of the present disclosure, as well as details of various implementations thereof, will be more fully understood from the following description and drawings.

DETAILED DESCRIPTION OF THE INVENTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Figure 1:
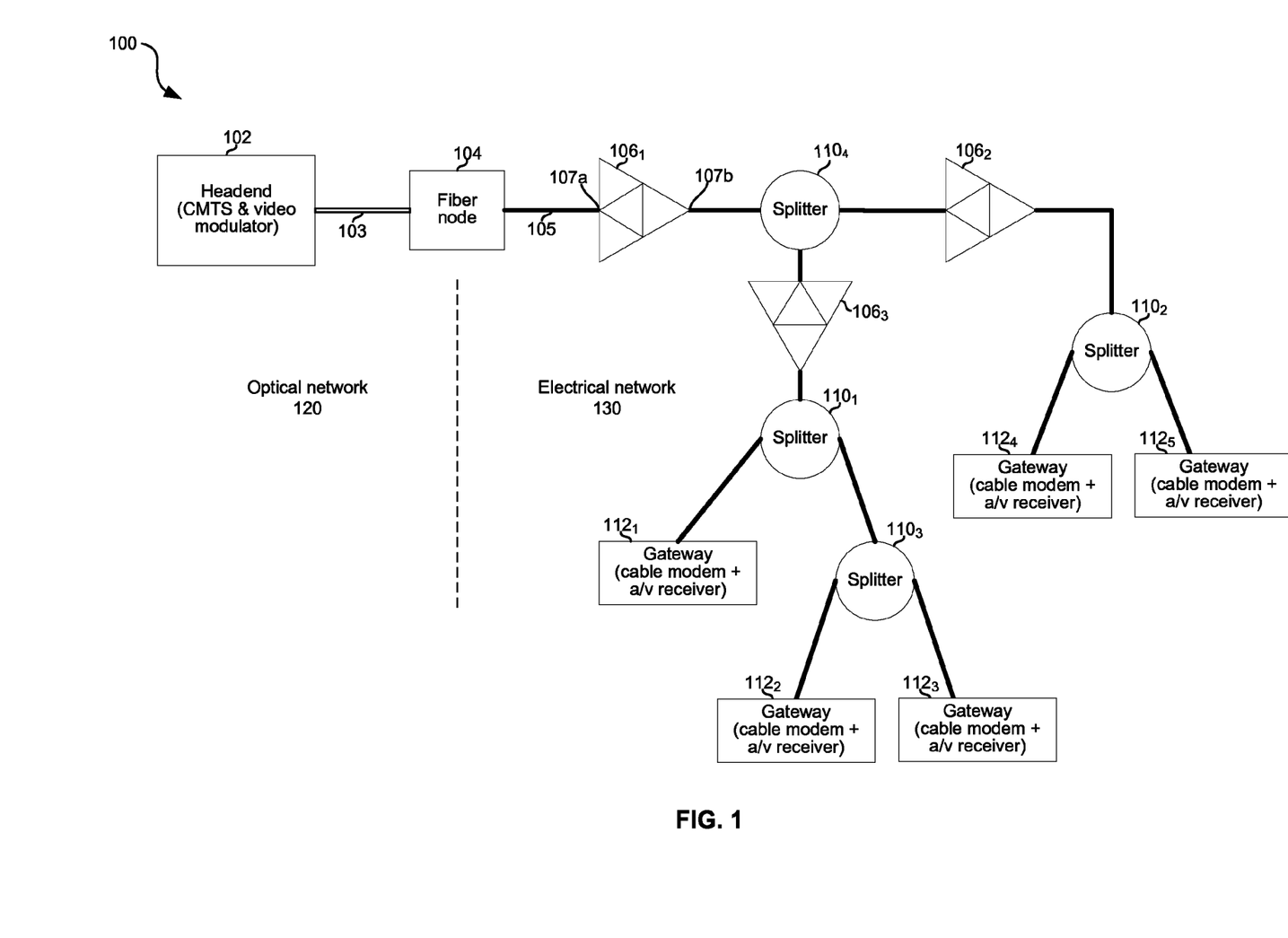
FIG. 1 is a diagram depicting an example hybrid fiber-coaxial (HFC) network.

FIG. 1 is a diagram depicting an example hybrid fiber-coaxial (HFC) network. The example HFC network 100 comprises a headend 102, a fiber node 104, amplifiers $106_1$-$106_3$, splitters $110_1$-$110_4$, and gateways $112_1$-$112_5$.

The headend 102 comprises a cable modem termination system (CMTS) for handling DOCSIS traffic to and from the cable modems of gateways $112_1$-$112_5$ and one or more modulators (e.g., one or more "edge QAMs") for handling downstream multimedia traffic to the audio/video receivers of the gateways $112_1$-$112_5$.

The fiber node (FN) 104 may provide an interface between the optical network 120 and the electrical network 130. The fiber node 104 may, for example, be as described below with reference to FIGS. 2A-3G.

Each of the amplifiers $106_1$-$106_3$ may comprise a bidirectional amplifier which may amplify downstream signals and upstream signals, where downstream signals are input via upstream interface 107a and output via downstream interface 107b, and upstream signals are input via downstream interface 107b and output via upstream interface 107a. The amplifier $106_1$, which amplifies signals along the main coaxial "trunk," may be referred to as a "trunk amplifier." The amplifiers $106_2$ and $106_3$, which amplify signals along "branches" split off from the trunk, may be referred to as "branch" or "distribution" amplifiers.

Each of the splitters $110_1$-$110_4$ may comprise circuitry operable to output signals incident on each of its interfaces onto each of its other interfaces. Each of the splitters $110_1$-$110_4$ may be a passive or active device.

Each of the gateways $112_1$-$112_5$ may comprise cable modem circuitry operable to communicate with, and be managed by, the headend 102 in accordance with one or more standards (e.g., DOCSIS). Each of the gateways $112_1$-

$112_5$ may comprise one or more audio/video receivers operable to receive multimedia content (e.g., in the form of one or more MPEG streams) transmitted by the headend in accordance with one or more standards used for cable television. Each of the gateways $112_1$-$112_5$ may reside at the premises of a cable/DOCSIS subscriber.

Figure 2A:
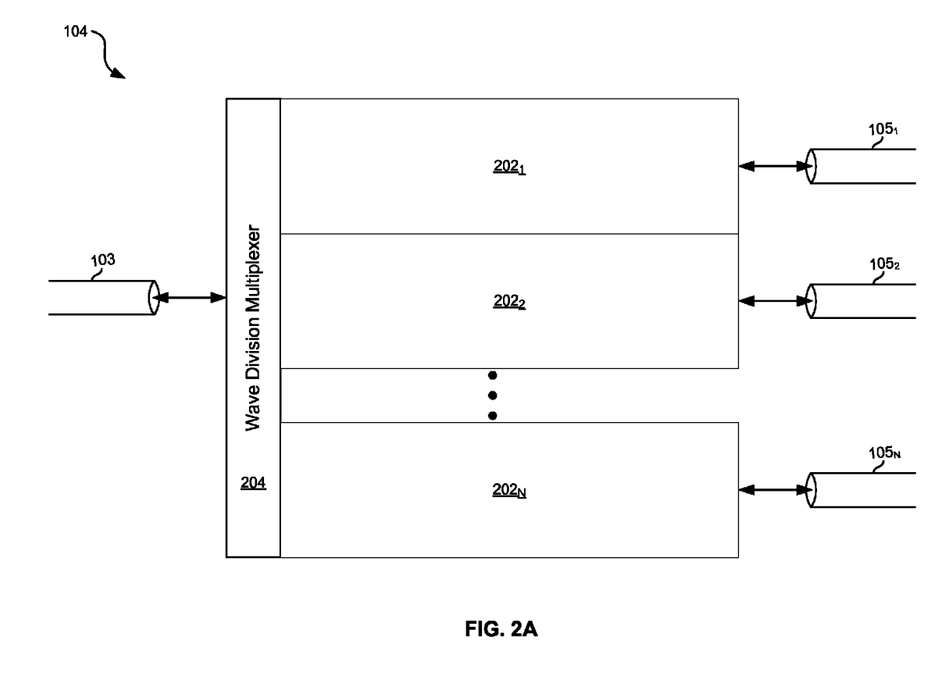
FIG. 2A is a diagram depicting an example implementation of a fiber node.

FIG. 2A is a diagram depicting an example implementation of a fiber node. Referring to FIG. 2A, the depicted example implementation of fiber node 104 comprises a wave division multiplexer (WDM) 204 and modules $202_1$-$202_N$ (where N is an integer).

The WDM 204 is operable to multiplex up to N upstream signals from up to N modules 202 onto the fiber 103, and demultiplex up to N downstream signals from the fiber 103 to up to N modules 202.

Each module $202_n$ ($1 \leq n \leq N$) is operable to receive an optical signal via fiber 103 and output a corresponding electrical signal on coaxial cable $105_n$, and receive an electrical signal on coaxial cable $105_n$ and output a corresponding optical signal on fiber 103. Each module $202_n$ may, for example, be as described below with reference to FIGS. 2B-3G.

Figure 2B:
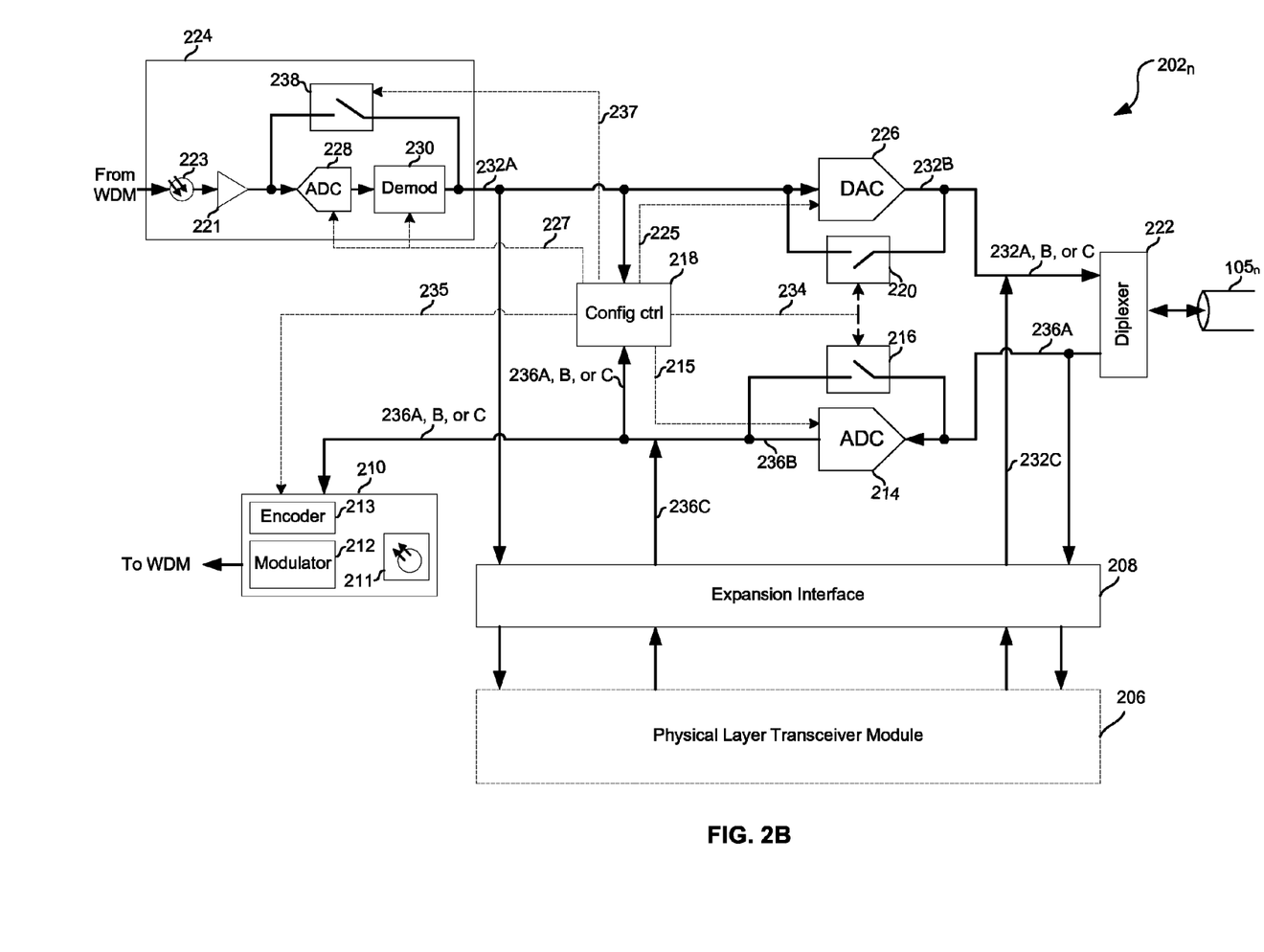
FIG. 2B is a diagram depicting an example implementation of a multi-mode fiber node.

FIG. 2B is a diagram depicting an example implementation of a multi-mode fiber node. Referring to FIG. 2B, there is shown a module $202_n$ of the FN 104. The module $202_n$ comprises an optical receiver 224, a digital-to-analog converter (DAC) 226, switch 220, diplexer 222, switch 216, analog-to-digital converter (ADC) 214, configuration controller 218, optical transmitter 210, and an expansion interface 208 via which a physical layer transceiver module 206 may be installed in the module $202_n$.

The digital-to-analog converter (DAC) 226 is operable to convert a digital signal 232A to an analog representation which is output as signal 232B when the DAC 226 is enabled. This conversion to analog may be to support legacy cable modems and/or A/V receivers.

Each of the switches 220, 216, and 238 is operable to open and close a bypass path based on control signal 234. Each of the switches 220, 216, and 238 may comprise, for example, a transmission gate, a relay, a MEMS switch, and/or the like. The DAC 226 may be enabled and disabled based on the control signal 225.

The analog-to-digital converter (ADC) 214 is operable to digitize the analog signal 236A to generate a digitized waveform 236B when the ADC 214 is enabled. The ADC 214 may be enabled and disabled based on the control signal 215.

The diplexer 222 may be operable to couple downstream signal 232A, B, or C (depending on the configuration) onto the coaxial cable $105_n$ while concurrently passing upstream signals from coax $105_n$ into the FN as signal 236.

The expansion interface 208 is operable to connect the signals 232A, 236C, 236A, and 236C to a physical layer transceiver module 206, which may be installed in, or with, the module $202_n$. The physical layer transceiver may be a field-installable module (i.e., may be installed as an upgrade to the FN 104 after the FN 104 has been deployed in the HFC). In an example implementation, the physical layer transceiver module 206 may be "hot-swappable" such that it can be installed or removed without powering down the FN 104, and may be "plug and play" such that the module $202_n$ can auto-detect the presence or absence of the module 206 and configure itself accordingly.

The optical receiver 224 is operable to receive an optical signal and convert it to an electrical signal 232A. In the example implementation depicted, the optical receiver 224 comprises a laser diode detector 223, a gain control circuit 221, an analog-to-digital converter (ADC) 228, demodulator 230, and switch 238.

The analog-to-digital converter (ADC) 214 is operable to digitize the analog signal output by gain circuit 221 to generate a digital signal which is then demodulated by demodulator 230. The demodulator may be, for example, an amplitude shift keying (ASK) demodulator. For digitized waveform downstream, the switch 238 may be configured, via signal 237, to be open and the ADC 228 and demod 230 may be enabled via signal 227, such that a digital signal 232A is generated. For analog downstream, the switch 238 may be configured, via signal 237, to be closed such that the analog signal out of gain circuit 221 is output as signal 232A. For analog downstream the ADC 228 and demod 230 may be disabled, via signal 227, to reduce energy consumption.

The optical transmitter 210 is operable to receive an electrical signal 236A, B, or C (depending on the configuration) and convert it to an optical signal for output onto the fiber 103 (via WDM 204). The optical transmitter 210 may comprise, for example, a laser diode 211, an encoder 213, and a modulator 212.

The encoder 213 may support one or more configurations, each corresponding to a respective one of a plurality of line encoding schemes (e.g., return-to-zero, non-return-to-zero, etc.). Which configuration is used by the encoder 213 at any given time may be determined based on control signal 235.

The modulator 212 may modulate the phase, frequency, and/or amplitude of the optical signal output by the laser diode 211. In an example implementation, the modulator may support various configurations, each corresponding to a respective one of a plurality of modulation schemes. Which configuration is used by the modulator 212 at any given time may be determined based on control signal 235. In an example implementation, in a first configuration the modulator 212 performs analog modulation of the intensity of the optical signal based on the analog signal 236A, and in a second configuration the modulator 212 performs on-off keying according to a digital signal 236B encoded by encoder 213.

The configuration controller 218 is operable to control a configuration of the module $202_n$. This may include, for example, configuring the switches 220, 216 and 238, the DAC 226, the ADC 214, the optical receiver 224, and/or the optical modulator 224.

The module $202_n$ is reconfigurable among a plurality of configurations. Five example configurations are described below with reference to FIGS. 3A-3F. Which configuration the module $202_n$ is operating in at any given time depends on the configuration of the headend 102 that serves the module $202_n$ and is transparent to the gateways 112 served by the module $202_n$. Accordingly, the fiber node (FN) 104 may be installed for use with a first headend and may be forward compatible with a subsequently-installed headend. For example, the module $202_n$ may simply need to be reconfigured, rather than replaced, when the headend 102 is upgraded from analog upstream to "digital return" (i.e., going from the configuration of FIG. 3A to the configuration of FIG. 3B). This reconfiguration may be achieved remotely without a technician having to go to the FN 104. As another example, the module $202_n$ may simply need to be reconfigured, rather than replaced, when the headend 102 goes from "digital return" to "remote PHY" (i.e., going from the configuration of FIG. 3B to the configuration of FIG. 3E). Where module 206 is pre-installed in the module $202_n$, this reconfiguration may be accomplished remotely without having to send a technician to the FN 104. Alternatively, this reconfiguration may comprise a technician going to the FN 104 and simply plugging in the module 206—requiring little time, little expertise, and no special tools (e.g., no soldering required and only a screwdriver or wrench to open up a housing for accessing the interface 208).

Figure 3A:
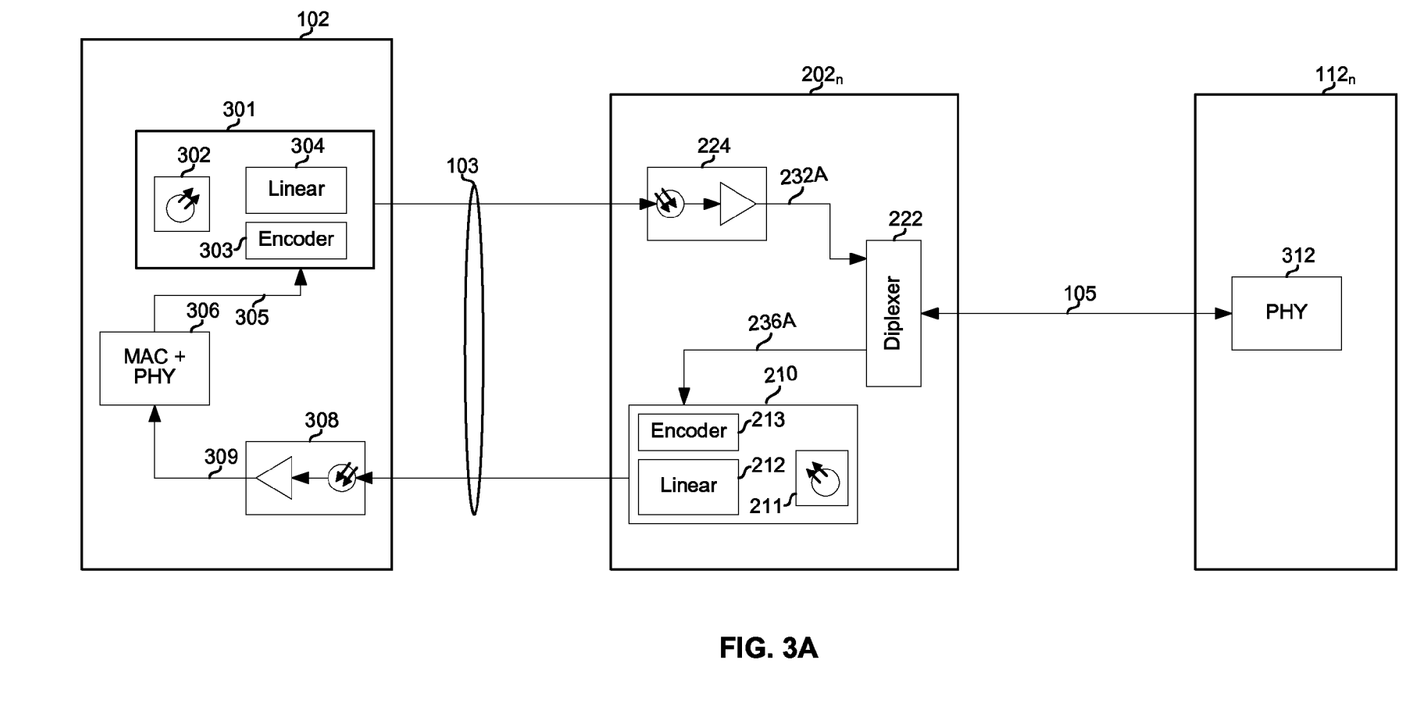
FIG. 3A shows the fiber node of FIG. 2B configured for analog downstream and analog upstream.

FIG. 3A shows the fiber node of FIG. 2B configured for analog downstream and analog upstream. Referring to FIG. 3A, there is shown the headend 102, the module $202_n$, and the gateway $112_n$. The example headend 102 comprises an optical transmitter 301, a MAC+PHY circuit 306, and an optical receiver 308. The example gateway $112_n$ comprises a physical layer transceiver circuit 312.

The optical transmitter 301 is operable to receive an electrical signal 305 and convert it to an optical signal for output onto the fiber 103. The optical transmitter 301 may comprise, for example, a laser diode 302 similar to diode 211, an encoder 303 similar to encoder 213, and a modulator 304 similar to modulator 212.

The optical receiver 308 is operable to receive an optical signal via fiber 103 and convert it to an electrical signal 309. The optical receiver 308 may comprise, for example, a laser diode detector similar to detector 223 and a gain control circuit similar to gain control circuit 221.

The MAC+PHY circuit 306 is operable to implement headend media access control (MAC) and physical layer functions according to DOCSIS (e.g., DOCSIS 1.0, 2.0, 3.0, and/or others) and/or cable television standards.

The physical layer transceiver circuit 312 is operable to implement cable modem MAC and physical layer functions according to DOCSIS (e.g., DOCSIS 1.0, 2.0, 3.0, and/or others) and/or cable television standards.

In the configuration of FIG. 3A, the ADC 214, DAC 226, ADC 228, and demod 230 are disabled (i.e., powered down) and each of switches 220, 216, and 238 is closed such that the DAC 226, ADC 214, ADC 228, and demod 230 are bypassed. In the configuration of FIG. 3A, the encoder 213 is disabled and the modulator 212 is configured to perform analog modulation of the intensity of the optical signal output by diode 211 based on the analog signal 236A. In the configuration of FIG. 3A, the headend 102 comprises optical receiver 308, which is configured to receive an analog modulated optical signal.

Figure 3B:
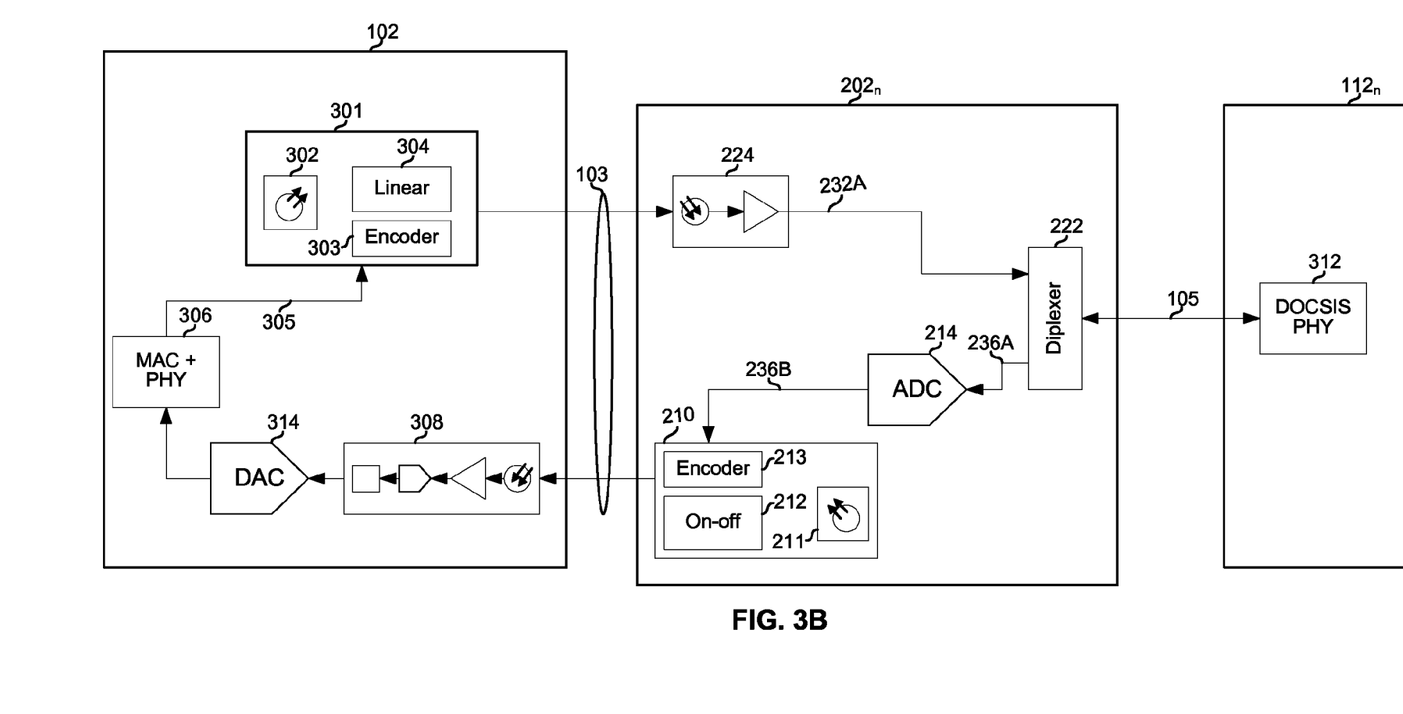
FIG. 3B shows the fiber node of FIG. 2B configured for analog downstream and digitized waveform upstream.

FIG. 3B shows the fiber node of FIG. 2B configured for analog downstream and digitized waveform upstream. Referring to FIG. 3B, there is shown the headend 102, the module $202_n$, and the gateway $112_n$. In addition to components shown in FIG. 3A, also shown are DAC 314 and ADC 214. Also, relative to FIG. 3A, components 308 and 210 are reconfigured.

In the configuration of FIG. 3B, the switches 220, 216, and 238 (FIG. 2B) are configured such that the ADC 214 is in the upstream processing path while the DAC 226, ADC 228, and demod 230 are disabled and bypassed in the downstream processing path. In the configuration of FIG. 3B, the ADC 214 digitizes the signal 236A to generate digitized signal 236B, the encoder 213 encodes the digitized signal 236B, and the modulator 212 is configured to digitally modulate (e.g., using on-off keying) the intensity of the optical signal output by diode 211 based on the output of the encoder 213. In the configuration of FIG. 3A, the headend 102 comprises optical receiver 310, which is configured to receive a digitized waveform optical signal.

Where supported, the configuration of FIG. 3B may be chosen over the configuration of FIG. 3A because, for example, the digitized upstream signal of FIG. 3B is more tolerant of noise than the analog modulated upstream signal of FIG. 3A.

Figure 3C:
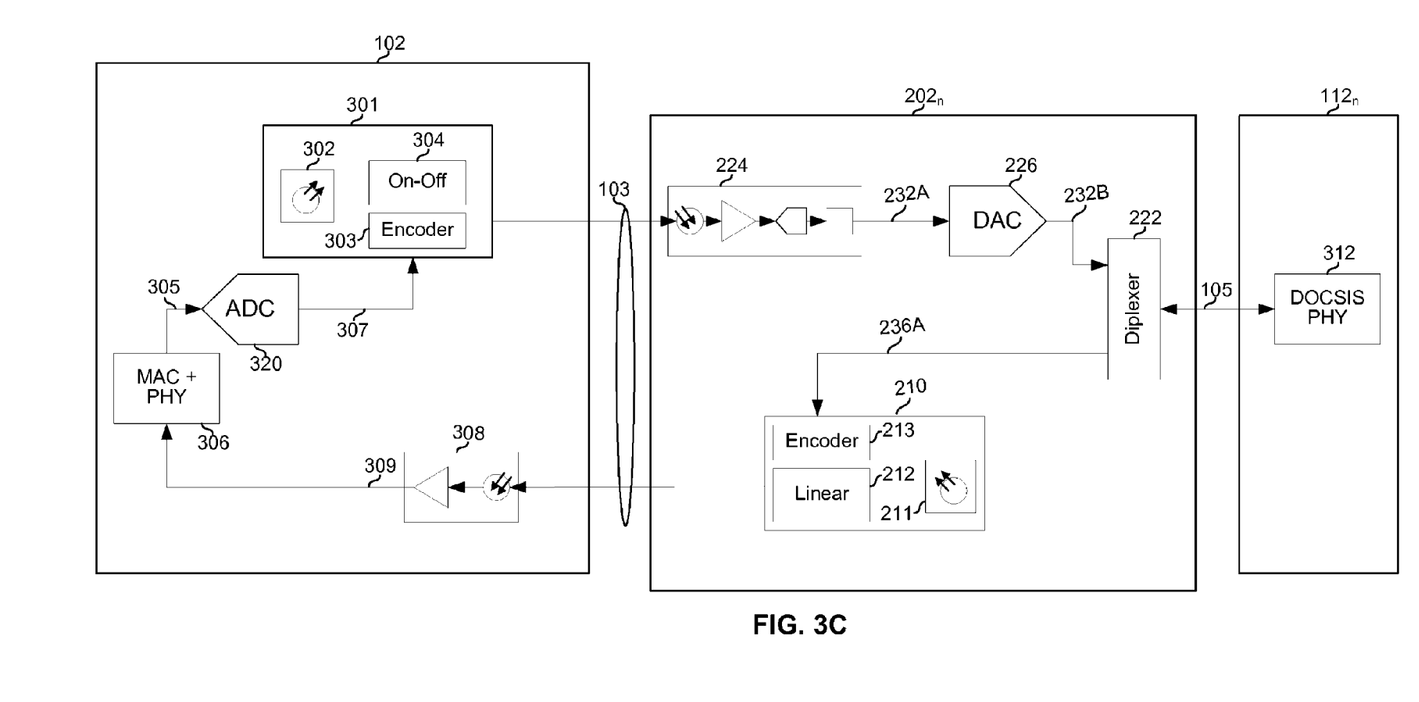
FIG. 3C shows the fiber node of FIG. 2B configured for digitized waveform downstream and analog upstream.

FIG. 3C shows the fiber node of FIG. 2B configured for digitized waveform downstream and analog upstream. In addition to components shown in FIG. 3A, also shown are DAC 226 and ADC 320. Also, relative to FIG. 3A, components 301 and 224 are reconfigured.

In the configuration of FIG. 3C, the ADC 320 digitizes the signal 305 to generate digitized signal 307, the encoder 303 encodes the digitized signal 307, and the modulator 304 is configured to digitally modulate (e.g., using on-off keying) the intensity of the optical signal output by diode 302 based on the output of the encoder 303. In the configuration of FIG. 3C, the switches 220, 216, and 238 (FIG. 2B) are configured such that the DAC 226, ADC 228, and demod 230 are in the downstream processing path while the ADC 214 is disabled and bypassed in the upstream processing path. In the configuration of FIG. 3C, the optical receiver 308 is configured to receive an analog modulated optical signal.

Figure 3D:
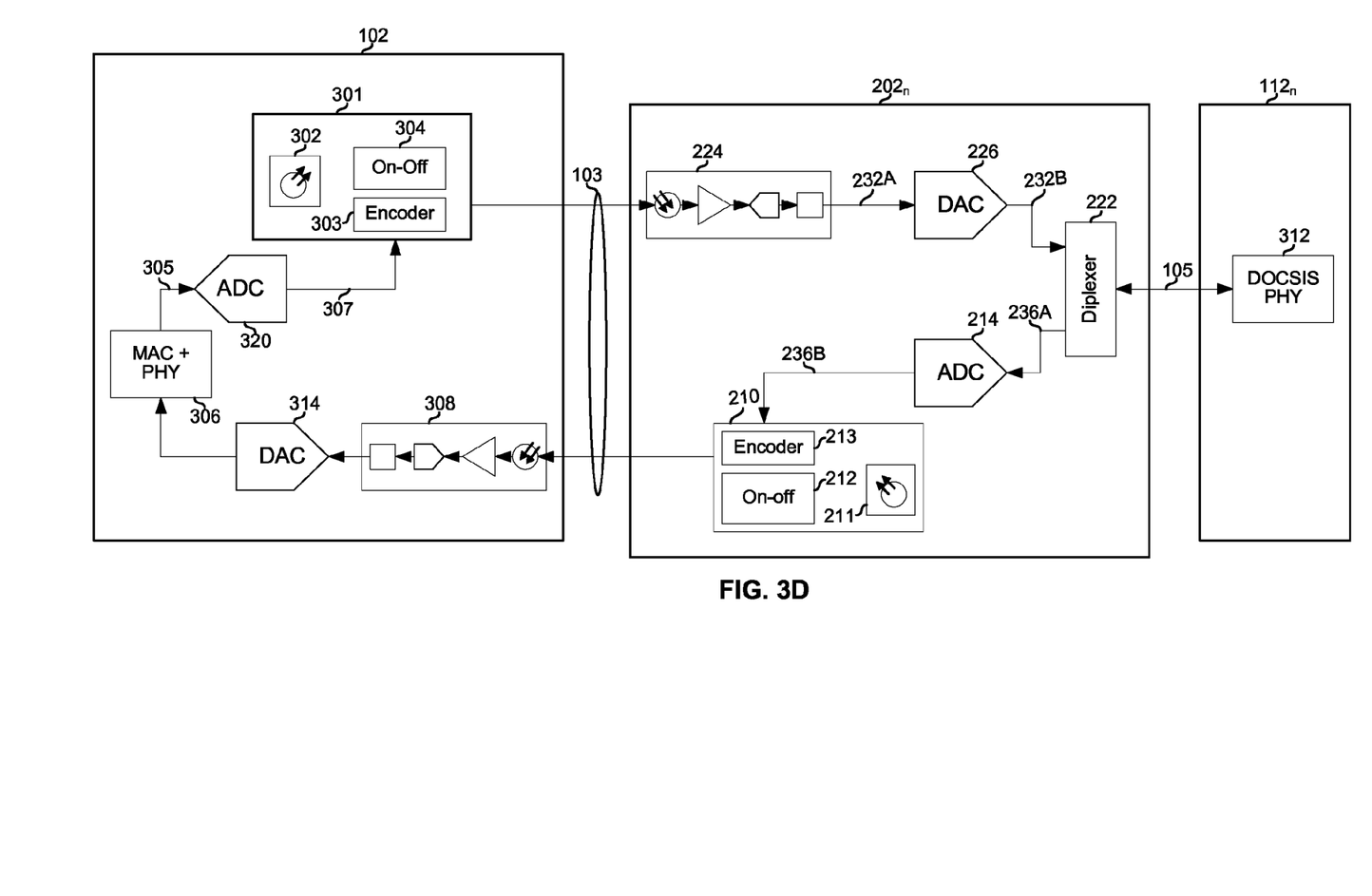
FIG. 3D shows the fiber node of FIG. 2B configured for digitized waveform downstream and digitized waveform upstream.

FIG. 3D shows the fiber node of FIG. 2B configured for digital downstream and digital upstream. Referring to FIG. 3D, there is shown the headend 102, the module $202_n$, and the gateway $112_n$. In the configuration of FIG. 3D, the switches 220, 216, and 238 (FIG. 2B) are configured such that the ADC 214 is in the upstream processing path and the DAC 226, ADC 228, and demod 230 are in the downstream processing path. In the configuration of FIG. 3D, the downstream is configured as in FIG. 3C and the upstream is configured as in FIG. 3B.

Figure 3E:
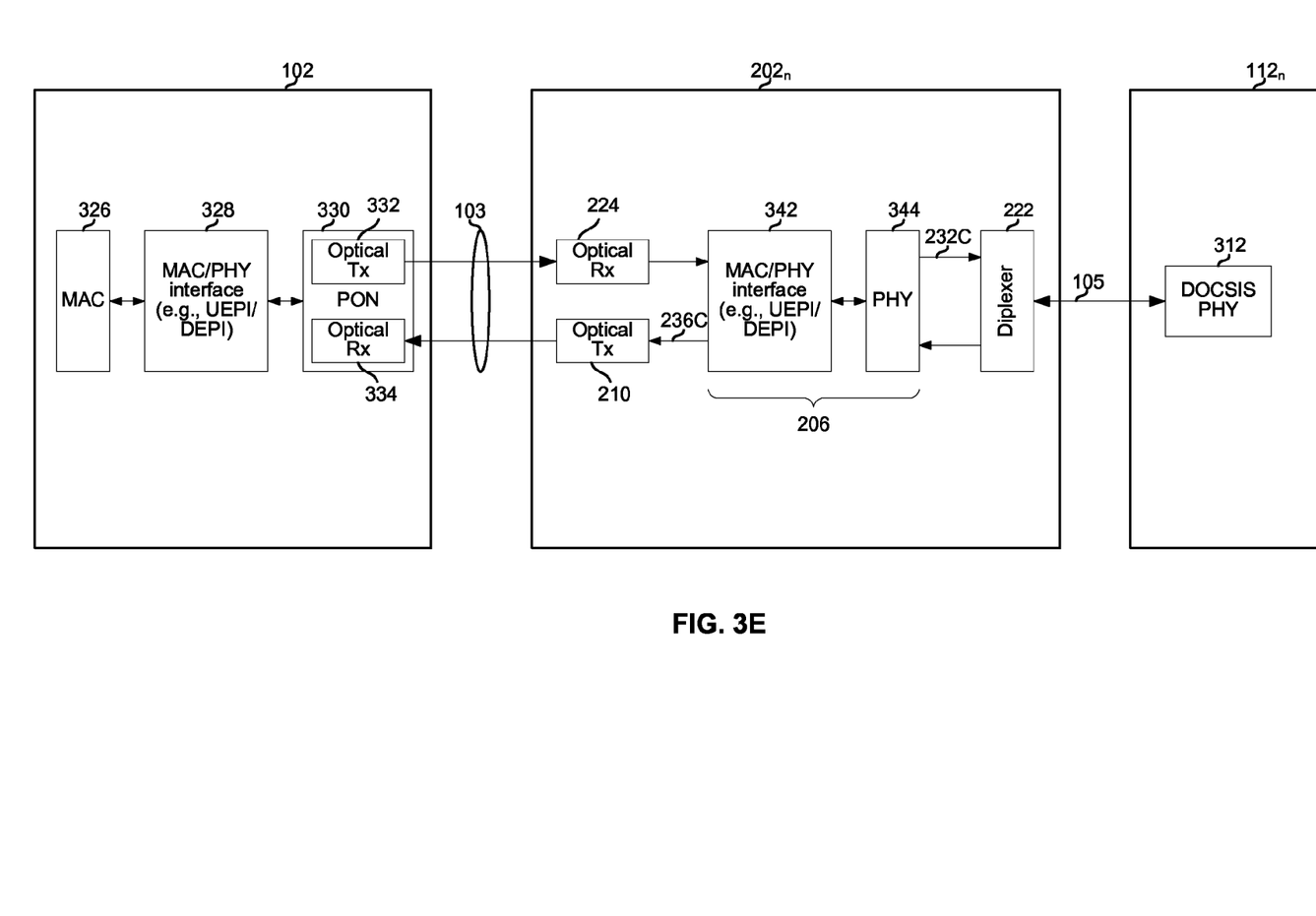
FIG. 3E shows the fiber node of FIG. 2B in a "remote PHY" upstream and "remote PHY" downstream configuration.

FIG. 3E shows the fiber node of FIG. 2B in a "remote PHY" upstream and "remote PHY" downstream configuration. Referring to FIG. 3E, there is shown the headend 102, the module $202_n$ and the gateway $112_n$.

The example headend 102 comprises a MAC 326, a MAC/PHY interface 328, and a passive optical network (PON) interface 330. The example PON interface 330 comprises an optical transmitter 332 and an optical receiver 334.

The MAC 326 is operable to perform headend MAC layer functions according to DOCSIS and/or cable television standards. The MAC/PHY interface 328 may be, for example, an upstream external PHY interface (UEPI), downstream external PHY interface (DEPI), a packet access shelf interface (PASI) and/or any other suitable interface. The PON interface 330 is operable to communicate over the fiber 103 in accordance with one or more optical network standards such as, for example, Ethernet over passive optical network (EPON) and/or gigabit Ethernet over passive optical network (GPON).

In the configuration of FIG. 3E, the module 206 is installed and comprises a MAC/PHY interface 342 and PHY 344. In the configuration of FIG. 3E, the switches 220 and 216 are open and the ADC 214 and DAC 226 are disabled such that both the upstream signal path and the downstream signal path are routed through the module 206. In the configuration of FIG. 3E, the optical transmitter 332 is configured to send optical signals in accordance with the PON standard in use (e.g., EPON or GPON). In the configuration of FIG. 3E, the optical receiver 224 is configured to receive optical signals in accordance with the PON standard in use (e.g., EPON or GPON).

The MAC/PHY interface 342 is the complement of, and is the same as, the MAC/PHY interface 328. The PHY 344 is operable to communicate over the electrical network in accordance with one or more physical layer standards (e.g., DOCSIS 1.0. 2.0, and/or 3.0. Such functions may include, for example, registration/deregistration of cable modems on the network, ranging operations, allocation of bandwidth on the coaxial cable 105 (e.g., including generation of media access plan (MAP) messages), and/or the like.

In the configuration of FIG. 3E, upstream and downstream communications over the fiber 103 utilize digital signals in accordance with, for example, QAM and/or some other digital modulation protocol/standard. In the configuration of FIG. 3E, downstream payload data is received from the headend 102 via the optical network and the interfaces 328 and 342. The payload data is then modulated in the PHY 344 according to a physical layer standard/protocol expected/supported by the gateways 112 that are served by module $202_n$. In the configuration of FIG. 3E, upstream signals from the gateways 112 served by the module $202_n$ are demodulated in the PHY 344 to recover the payload data which is then sent over the optical network via the interface 342, the optical network, and the interface 328.

The configuration of FIG. 3E may be chosen over the configuration of FIG. 3D because sending only payload data and relatively-little protocol overhead (headers, etc.) necessitated by the PON standard (e.g., GON or EPON) may enable much more efficient utilization of the bandwidth of fiber 103 as opposed to sending digitized waveforms as in FIG. 3D, because the digitized waveforms must be digitized at significantly higher than the Nyquist rate for noise tolerance, etc.

Figure 3F:
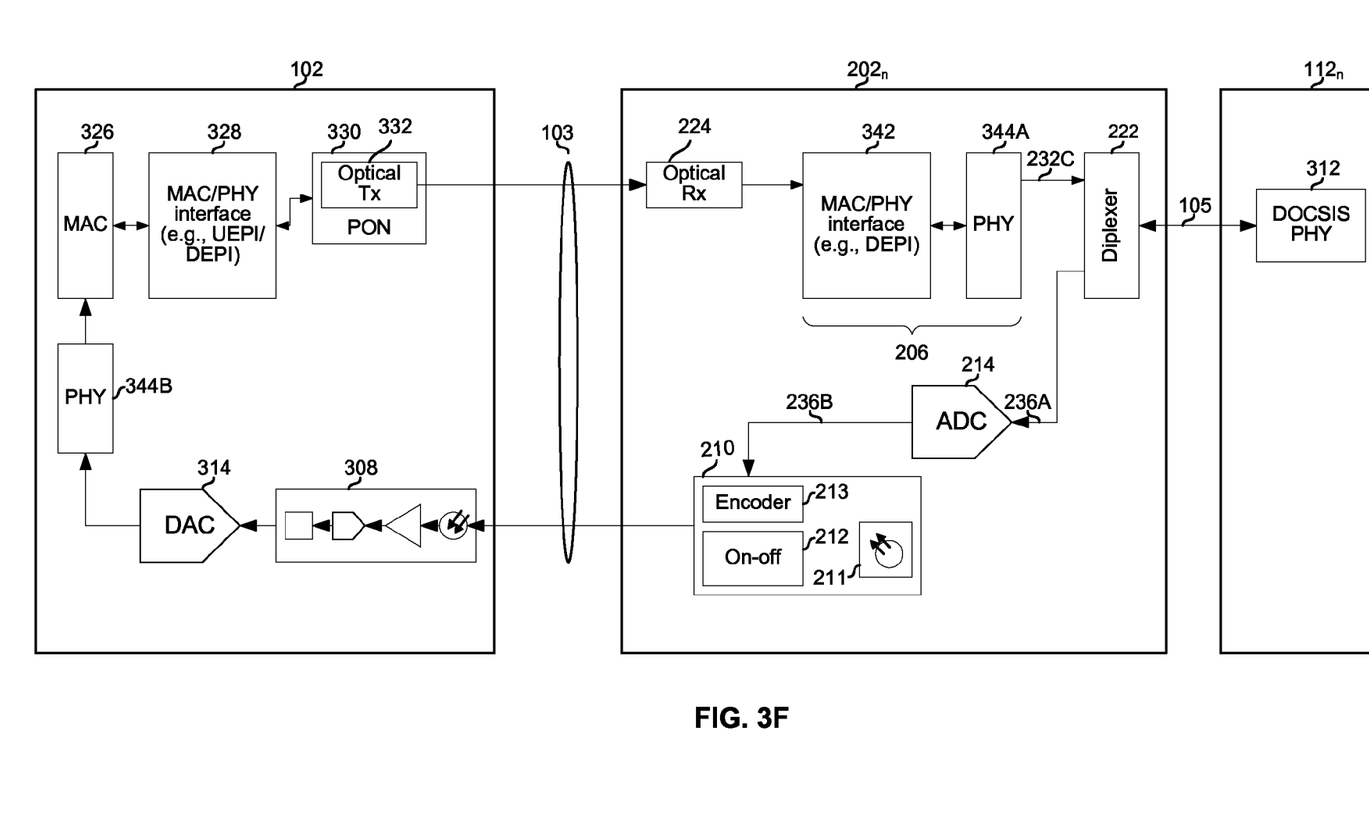
FIG. 3F shows the fiber node of FIG. 2B in a digitized waveform upstream and "remote PHY" downstream configuration.

FIG. 3F shows the fiber node of FIG. 2B in a digitized waveform upstream and "remote PHY" downstream configuration. In FIG. 3F the downstream is configured as in FIG. 3E and the upstream is configured as in FIG. 3D. For this configuration, the interface 342 and PHY 344A may need only support downstream (and not upstream) while the PHY 344B may need only support upstream (and not downstream).

While FIGS. 3A-3F show various combinations of particular upstream path configurations paired with particular downstream paths configurations, any of the upstream path configurations shown in FIGS. 3A-3F may be used in combination with any of the downstream path configurations shown in FIGS. 3A-3F.

Figure 3G:
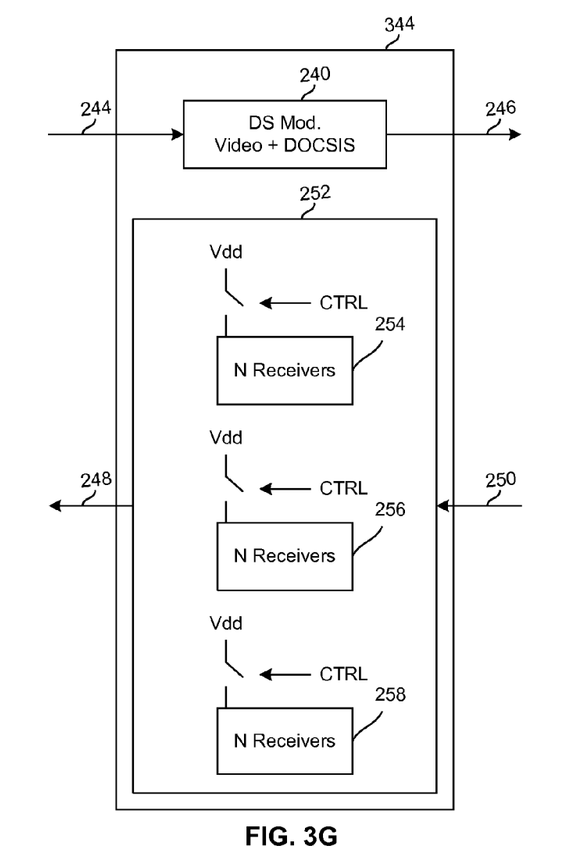
FIG. 3G depicts an example physical layer transceiver module which is configurable to trade off power and capacity.

FIG. 3G depicts an example physical layer transceiver module which is configurable to trade off power and capacity. Shown is an example implementation of the PHY 344 of module 206. The depicted PHY 344 comprises three banks of burst receivers 254, 256, 258 each of which is operable to serve N (an integer) cable modems. Each of the banks of receivers 254, 256, 258 may be electronically enabled or disabled by, for example, a control signal from the headend 102. For example, a switch between a power rail and a particular bank of receivers 254, 256, 258 may be closed in response to a particular control signal from the headend 102. In this manner, the number of cable modems which may be served by the module $202_n$ may be increased simply by enabling more of the receiver banks 254, 256, 258. Conversely, where there are fewer cable modems to serve, one or more of the banks 254, 256, and 258 can be disabled to conserve energy.

Selective enabling of the receiver banks 254, 256, 258 may be used, for example, to allow cable providers to "pay as they go." For example, as the number of subscribers served by the module $202_n$ increases, the cable provider may pay a supplier of the module $202_n$ for codes (e.g., alphanumeric strings) that, when sent to the module $202_n$ in a control message, enable more of the banks of receivers 254, 256, 258. In this way, the cost of the module 206 can be prorated over an extended period of time as the number of subscribers increases. In another implementation, other components (e.g., the entirety of one or more of modules $202_1$-$202_N$) may be enabled on demand as the cable provider needs additional capacity.

In accordance with an example implementation of this disclosure, a fiber node (e.g., 104) may comprise circuitry that includes an ADC (e.g., 214) and that is configured to interface to an optical network (e.g., 120) and an electrical network (e.g., 130). In a first configuration (e.g., configuration of FIG. 3A), the circuitry may be configured to modulate an optical carrier (e.g., output by diode 211) by an analog upstream electrical signal received via the electrical network (e.g., signal 236A). In a second configuration, the circuitry may be configured to digitize, via the ADC, the analog upstream electrical signal to generate a digitized upstream signal (e.g., 236B), and modulate the optical carrier with the digitized upstream signal. The circuitry may comprise a DAC (e.g., 226) and an optical receiver (e.g., 224). The optical receiver may be configured to convert a downstream optical signal to a downstream electrical signal (e.g., 232A). In the first configuration, the downstream electrical signal may be a first analog signal (e.g., 232A) and the circuitry may be configured to output the first analog signal into the electrical network. In a third configuration, the downstream electrical signal is a digitized waveform and the circuitry is configured to convert the digitized waveform to a second analog signal (e.g., 232B) and output the second analog signal into the electrical network.

The circuitry may be operable to detect characteristics (e.g., modulation, encoding, etc.) of upstream electrical signals received via the electrical network. The circuitry may be operable to detect characteristics (e.g., whether an analog waveform, a digitized waveform, or a G/EPON signal) of downstream signals received via the optical network. The circuitry may be operable to select among the first configuration, the second configuration, and the third configuration based on detected signal characteristics. The circuitry may be operable to select among the first configuration, the second configuration, and the third configuration in response to a control signal sent by a cable modem termination system (CMTS) (e.g., 102) specifically for the purpose of the selection.

The circuitry may comprise an interface (e.g., 208) for connecting to a physical layer transceiver module (e.g., 206) that is operable to communicate in accordance with DOCSIS (e.g., DOCSIS 1.0, 2.0, 2. and/or 3.0) standards. The circuitry and the physical layer transceiver module may be configured such that installation of the physical layer transceiver module into the fiber node requires no soldering and is plug and play. The physical layer transceiver module may be configurable into and may select, at any given time, one among a plurality of settings. A first of the settings may enable the fiber node to support a first quantity of cable modems (e.g., a first quantity of the switches in FIG. 3G are closed), and a second of the settings may enable the fiber node to support a second quantity of cable modems (e.g., a second quantity of the switches in FIG. 3G are closed), where the second quantity is greater than the first quantity. The physical layer transceiver module may be operable to determine a number of active cable modems coupled to the fiber node. The physical layer transceiver module may be operable to select between the first setting and the second setting based on the determined number of active cable modems coupled to the fiber node. The physical layer transceiver module may be operable to select one among the plurality of settings in response to a control signal sent by a cable modem termination system (CMTS) specifically for the purpose of the selection.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the methods described herein.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
   circuitry for use in a fiber node of a hybrid fiber-coaxial network, wherein:
   said circuitry comprises an analog-to-digital converter (ADC), an optical receiver, a digital-to-analog converter (DAC), an optical transmitter comprising a modulator, and a switch for selectively bypassing said ADC;
   said circuitry is configured to interface to an optical network via said optical transmitter and said optical receiver and an electrical network via a diplexer coupled to said DAC and said ADC;
   in a first configuration, said modulator is operable to modulate an optical carrier with an analog upstream electrical signal received via said electrical network and said ADC is bypassed by said switch; and
   in a second configuration, said circuitry is operable to digitize, via said ADC, said analog upstream electrical signal to generate a digitized upstream signal, and modulate, via said modulator, said optical carrier with said digitized upstream signal.

2. The system of claim 1, wherein:
   said optical receiver is configured to convert a downstream optical signal to a downstream electrical signal;
   in said first configuration, said downstream electrical signal is a first analog signal and said circuitry is operable to output said first analog signal into said electrical network via said diplexer; and
   in a third configuration, said downstream electrical signal is a digitized waveform and said circuitry is operable to convert, via said DAC, said digitized waveform to a second analog signal and output said second analog signal into said electrical network.

3. The system of claim 2, wherein said circuitry is operable to:
   detect characteristics of one or both of: upstream electrical signals received via said electrical network, and downstream signals received via said optical network; and
   select one of said first configuration, said second configuration, and said third configuration based on said detected characteristics.

4. The system of claim 2, wherein said circuitry is operable to select one of said first configuration, said second configuration, and said third configuration in response to a control signal sent by a cable modem termination system (CMTS) specifically for the purpose of said selection.

5. The system of claim 1, wherein said circuitry comprises an interface for connecting to a physical layer transceiver module of said fiber node that is operable to communicate over an electrical network in accordance with one or more physical layer standards.

6. The system of claim 5, wherein said circuitry and said physical layer transceiver module are configured such that installation of said physical layer transceiver module into said fiber node requires no soldering and is plug and play.

7. The system of claim 5, wherein said physical layer standards comprise data over cable service interface specification (DOCSIS) standards.

8. The system of claim 5, wherein:
   a first setting of a plurality of settings of said physical layer transceiver module enables said fiber node to support a first quantity of cable modems;
   a second setting of a said plurality of settings of said physical layer transceiver module enables said fiber node to support a second quantity of cable modems; and
   said second quantity is greater than said first quantity.

9. The system of claim 8, wherein said physical layer transceiver module is operable to:
   determine a number of active cable modems coupled to said fiber node; and
   select one of said first setting and said second setting based on said determined number of active cable modems coupled to said fiber node.

10. The system of claim 8, wherein said physical layer transceiver module is operable to select one of said plurality of configurations of said physical layer transceiver module in response to a control signal sent by a cable modem termination system (CMTS) specifically for the purpose of said selection.

11. A method comprising:
    performing by circuitry in a fiber node of a hybrid fiber-coaxial network, wherein said circuitry comprises an analog-to-digital converter (ADC), an optical receiver, a digital-to-analog converter (DAC), an optical transmitter comprising a modulator, and a switch for selectively bypassing said ADC, and wherein said circuitry is configured to interface to an optical network via said optical transmitter and said optical receiver and an electrical network via a duplexer coupler to said DAC and said ADC:

while in a first configuration, modulating, via said modulator, an optical carrier with an analog upstream electrical signal received via said electrical network and said ADC is bypassed by said switch; and while in a second configuration, digitizing, via said ADC, said analog upstream electrical signal to generate a digitized upstream signal, and modulating, via said modulator, said optical carrier with said digitized upstream signal.

12. The method of claim 11, wherein:
said optical receiver is configured to convert a downstream optical signal to a downstream electrical signal;
in said first configuration, said downstream electrical signal is a first analog signal;
in a third configuration, said downstream electrical signal is a digitized waveform; and
while in said first configuration said method comprises outputting said first analog signal into said electrical network via said diplexer; and
while in said third configuration said method comprises converting, via said DAC, said digitized waveform to a second analog signal and outputting said second analog signal into said electrical network via said diplexer.

13. The method of claim 12, comprising:
detecting, by said circuitry, characteristics of one or both of: upstream electrical signals received via said electrical network, and downstream signals received via said optical network; and
selecting, by said circuitry, one said first configuration, said second configuration, and said third configuration based on said detected characteristics.

14. The method of claim 12, comprising performing said selecting in response to a control signal sent by a cable modem termination system (CMTS) specifically for the purpose of said selection.

15. The method of claim 11, wherein said circuitry comprises an interface for connecting to a physical layer transceiver module of said fiber node that is operable to communicate over an electrical network in accordance with one or more physical layer standards.

16. The method of claim 15, wherein said circuitry and said physical layer transceiver module are configured such that installation of said physical layer transceiver module into said fiber node requires no soldering and is plug and play.

17. The method of claim 15, wherein said one or more physical layer standards comprise data over cable service interface specification (DOCSIS) standards.

18. The method of claim 15, wherein:
a first setting of a plurality of settings of said physical layer transceiver module enables said fiber node to support a first quantity of cable modems;
a second setting of said plurality of settings of said physical layer transceiver module enables said fiber node to support a second quantity of cable modems; and
said second quantity is greater than said first quantity.

19. The method of claim 18, comprising:
determining, by said physical layer transceiver module, a number of active cable modems coupled to said fiber node; and
selecting, by said physical layer transceiver module, between said first setting and said second setting based on said determined number of active cable modems coupled to said fiber node.

20. The method of claim 18, comprising performing said selecting in response to a control signal sent by a cable modem termination system (CMTS) specifically for the purpose of said selection.

* * * * *